US007764975B2

(12) United States Patent
Hosono et al.

(10) Patent No.: US 7,764,975 B2
(45) Date of Patent: Jul. 27, 2010

(54) BASE STATION AND COMMUNICATIONS METHOD FOR STORING BASE STATION INFORMATION INCLUDING A BASE STATION ID

(75) Inventors: Hiroyuki Hosono, Yokohama (JP); Shinichi Mori, Yokohama (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 564 days.

(21) Appl. No.: 11/738,140

(22) Filed: Apr. 20, 2007

(65) Prior Publication Data
US 2007/0249344 A1 Oct. 25, 2007

(30) Foreign Application Priority Data
Apr. 21, 2006 (JP) ............................. 2006-118420

(51) Int. Cl.
H04B 7/00 (2006.01)
H04B 1/38 (2006.01)
H04M 1/00 (2006.01)
(52) U.S. Cl. ................... 455/524; 455/525; 455/562.1; 455/560
(58) Field of Classification Search ................. 455/525, 455/524, 562.1, 561, 560
See application file for complete search history.

(56) References Cited

U.S. PATENT DOCUMENTS

| 4,881,271 | A | * | 11/1989 | Yamauchi et al. ........... 455/436 |
| 5,212,831 | A | | 5/1993 | Chuang et al. |
| 5,276,730 | A | | 1/1994 | Cimini, Jr. et al. |
| 5,613,211 | A | * | 3/1997 | Matsuno ..................... 455/502 |
| 5,920,607 | A | | 7/1999 | Berg |
| 6,108,563 | A | * | 8/2000 | Shishino .................... 455/560 |
| 6,496,700 | B1 | | 12/2002 | Chawla et al. |
| 6,618,432 | B1 | | 9/2003 | Ganesh |
| 6,925,302 | B2 | * | 8/2005 | Kojima et al. ............. 455/435.3 |
| 7,016,680 | B2 | * | 3/2006 | Yagi .......................... 455/441 |
| 7,092,711 | B2 | * | 8/2006 | Masuda et al. ............. 455/439 |
| 7,486,638 | B2 | * | 2/2009 | Ofuji et al. ................. 370/329 |
| 7,493,137 | B2 | * | 2/2009 | Iwanaga et al. ............ 455/525 |
| 2004/0166858 | A1 | * | 8/2004 | Masuda et al. ............. 455/436 |
| 2005/0009555 | A1 | * | 1/2005 | Iwanaga et al. ............ 455/525 |
| 2005/0037798 | A1 | * | 2/2005 | Yamashita et al. .......... 455/525 |

(Continued)

FOREIGN PATENT DOCUMENTS

EP 1 104 977 A1 6/2001

(Continued)

*Primary Examiner*—Tilahun Gesesse
(74) *Attorney, Agent, or Firm*—Oblon, Spivak, McClelland, Maier & Neustadt, L.L.P.

(57) ABSTRACT

A base station and method of communication of a base station is provided. The base station includes a storage configured to store a predetermined number of base station information, each including a base station ID, an acquisition unit configured to acquire base station IDs, an aggregating unit configured to aggregate a number of times that each of the base station IDs is acquired, and a determination unit configured to determine a priority of each of the base station IDs. The base station also includes a judging unit configured to judge whether or not there is a base station ID having a priority higher than the base station ID stored in the storage, and a manager configured to delete from the storage, and store in the storage, base station information including a base station ID.

7 Claims, 7 Drawing Sheets

U.S. PATENT DOCUMENTS

| | | | |
|---|---|---|---|
| 2006/0009211 A1* | 1/2006 | Sato | 455/423 |
| 2006/0040705 A1* | 2/2006 | Kawakami et al. | 455/561 |
| 2006/0217158 A1* | 9/2006 | Uwano et al. | 455/562.1 |
| 2007/0298825 A1* | 12/2007 | Kayama et al. | 455/522 |
| 2008/0299984 A1* | 12/2008 | Shimomura et al. | 455/446 |

FOREIGN PATENT DOCUMENTS

| | | |
|---|---|---|
| JP | 11-215552 | 8/1999 |
| JP | 2001-54158 | 2/2001 |
| WO | WO 98/36588 | 8/1998 |
| WO | WO 03/013163 A1 | 2/2003 |

* cited by examiner

| YEAR / MONTH / DAY / HOUR / MINUTE / SECOND | MOBILE STATION ID | BASE STATION ID AT SOURCE / DESTINATION | SCRAMBLING CODE # | RECEIVING LEVEL | DELAY TIME |
|---|---|---|---|---|---|
| 2006 / 1 / 20 / 12 : 00 : 55 : 000 | U501 | B101 | 11 | Q1 | T1 |
| 2006 / 1 / 20 / 12 : 00 : 54 : 100 | U502 | B102 | 12 | Q2 | T2 |
| 2006 / 1 / 20 / 11 : 00 : 34 : 000 | U500 | B103 | 13 | Q3 | T3 |
| . . . | . . . | . . . | . . . | . . . | . . . |
| yyyy / mm / dd / tt : nn : ss : xxx | Uxxx | Bxxx | xx | Qx | Tx |

| PRIORITY | BASE STATION ID | SCRAMBLING CODE# | ACQUISITION NUMBER | AVERAGE OF RECEIVING LEVEL | AVERAGE OF DELAY TIME |
|---|---|---|---|---|---|
| 1 | B101 | 11 | 320 | AvQ1 | AvT1 |
| 2 | B102 | 12 | 250 | AvQ2 | AvT2 |
| 3 | B103 | 13 | 180 | AvQ3 | AvT3 |
| ⋮ | ⋮ | ⋮ | ⋮ | ⋮ | ⋮ |
| 32 | Bxxx | xx | xxx | AvQx | AvTx |
| ⋮ | ⋮ | ⋮ | ⋮ | ⋮ | ⋮ |
| 50 | B105 | 15 | 0 | — | — |

| BASE STATION ID | SCRAMBLING CODE # | BASE STATION CELL RANGE COORDINATES |
|---|---|---|
| B103 | 13 | LATITUDE N1 / LONGITUDE E1 / ALTITUDE H1 ~LATITUDE N2 / LONGITUDE E2 / ALTITUDE H2 |
| ⋮ | ⋮ | ⋮ |

FIG. 9A

| # | BASE STATION ID | SCRAMBLING CODE # |
|---|---|---|
| 1 | B101 | 11 |
| 2 | B102 | 12 |
| : | : | : |
| 32 | B105 | 15 |
| — | B191 | 21 |
| : | : | : |

BASE STATION INFORMATION WHICH CAN BE STORED (BASE STATION ID AND SCRAMBLING CODE)

BASE STATION INFORMATION WHICH HAS BEEN DELETED (BASE STATION ID AND SCRAMBLING CODE)

BASE STATION INFORMATION

| # | BASE STATION ID | SCRAMBLING CODE# |
|---|---|---|
| 1 | B101 | 11 |
| 2 | B102 | 12 |
| : | : | : |
| 32 | B103 | 13 |
| — | B105 | 15 |
| — | B191 | 21 |
| : | : | : |

BASE STATION INFORMATION WHICH CAN BE STORED (BASE STATION ID AND SCRAMBLING CODE)

BASE STATION INFORMATION WHICH HAS BEEN DELETED (BASE STATION ID AND SCRAMBLING CODE)

BASE STATION INFORMATION

A2
A1

BASE STATION AND COMMUNICATIONS METHOD FOR STORING BASE STATION INFORMATION INCLUDING A BASE STATION ID

CROSS REFERENCE TO RELATED APPLICATIONS

This application is based upon and claims the benefit of priority from the prior Japanese Patent Application No. P2006-118420, filed on Apr. 21, 2006; the entire contents of which are incorporated herein by reference.

BACKGROUND OF THE INVENTION

1. Field of the Invention

The present invention relates to a base station that communicates with a mobile station by using radio signals, and to a communications method of the base station.

2. Description of the Related Art

In a multiple access scheme employed in a mobile communications system, a plurality of mobile stations share the same radio transmission channel while making communications. As such a multiple access scheme, the following ones have heretofore been known: a Code Division Multiple Access (hereinafter referred to as CDMA) scheme, a Wideband CDMA (hereinafter referred to as W-CDMA) scheme, a Time Division Multiple Access (hereinafter referred to as TDMA) scheme, a Frequency Division Multiple Access (hereinafter referred to as FDMA) scheme, and the like.

In a mobile communications system that employs, for example, the CDMA scheme among the above-described multiple access schemes, the same frequency band is shared among a plurality of radio waves for communications. Such a mobile communications system is configured so that each of the radio waves for communications can be discriminated according to a spreading code which is a random code sequence.

Particularly, in the case of a mobile communications system of the W-CDMA scheme, it is required that a spreading code used for the mobile communications system have a code orthogonality enough to reduce mutual interferences among spreading codes different from one another, in addition to high detection and identification characteristics for the purpose of achieving high quality communications with low transmission power. For this reason, the number of allocatable spreading codes is less than the number of uplinks. In addition, although each of the spreading codes is repeatedly used among all the cells for effective use, a different code is used in addition to the spreading code for each of the base stations, for the purpose of preventing interferences among base stations (among cells). Moreover, in the case of a mobile communications system of the W-CDMA scheme, a spreading code with which user's data are actually spread in a wideband is referred to as a channelization code, and a code which is superimposed for each base station (cell) to prevent interferences among cells from occurring is referred to as a downlink scrambling code (refer to Japanese Patent Application Laid-open Publication No. Hei 11-215552).

In addition, in such a mobile communications system, a mobile station detects a base station, with which the mobile station is to communicate, on the basis of downlink scrambling codes informed from base stations to the mobile station. Moreover, in such a mobile communications system, each base station stores in advance, in a table (hereinafter referred to as a surrounding zone table), parameter information for radio communications, such as downlink scrambling codes, which are used by other base stations located in the surrounding zone of the base station, and thus the base station informs a mobile station of the downlink scrambling code through its own control channel. In addition, when a mobile station changes a base station with which the mobile station communicates due to the movement (for example, a handover is conducted), the mobile station detects a base station earlier, with which the mobile station is to communicate, on the basis of the downlink scrambling code informed prior to the moving. For this reason, in such a mobile communications system as described above, for example, in a case where a base station is newly established, it is necessary to identify other base stations (cells) located in the surrounding zone of the newly established base station (a cell), and concurrently store scrambling codes of the other base stations thus identified in a surrounding zone table of the newly established base station.

In this case, all the scrambling codes used by the mobile communications system may possibly stored in the surrounding zone table of the newly established base station no matter whether or not a base station is located around the newly established base station. However, the number of scrambling codes which can be stored in a surrounding zone table is limited (for example, 32) depending on a mobile communications system. Accordingly, in some cases, when scrambling codes are set in a surrounding zone table of a newly established base station, it is necessary to identify the other base stations located in the surrounding zone of the newly established base station on the basis of positional relationships on the topology between the other base stations and the newly established base station.

However, in this case, the actual radio range of the base station is sometimes different from a radio range on the topology due to the influence of, for example, structures and like. For this reason, the setting in the surrounding zone table may not be accurate. Specifically, on the basis of the actual radio ranges, scrambling codes of base stations that are located in the surrounding zone may not be stored in the surrounding zone table, but scrambling codes of base stations that are not located in the surrounding zone may be stored in the surrounding zone table. Therefore, for the purpose of more accurately storing the scrambling codes of other base stations in the surrounding zone table, a method in which radio signals are measured on the spot, or the like, has been used.

However, in a measuring operation on radio signals on the spot, it is necessary to measure radio signals in a wide radio range, leading to a large workload. Moreover, it is difficult to identify base stations located in the surrounding zone by accurately measuring radio range.

The present invention has been made in consideration of the above-described problems. An object of the present invention is to provide a base station and a communications method, in which parameter information for radio communications informed by the own base station can be set with a high accuracy, and which reduce workload at the time of the setting.

SUMMARY OF THE INVENTION

To achieve the above-described object, a first aspect of the present invention is a base station that communicates with a mobile station by using radio signals. The base station is characterized by including a storage, an acquisition unit, an aggregating unit, a determination unit, a judging unit and a manager. The storage is configured to store a predetermined number of base station information, each including a base station ID for discriminating a specific base station and parameter information for radio communications set for the specific base station. The acquisition unit is configured to acquire a base station ID of other base station forming a destination cell of the mobile station, or a base station ID of other base station forming a source cell of the mobile station. The aggregating unit is configured to aggregate the number of times that each of the base station IDs is acquired in a first time period. The determination unit is configured to determine a priority of each of the base station IDs on the basis of the aggregated results of the acquisition number. The judging unit is configured to judge among the base station IDs whose acquisition numbers are aggregated, whether or not there is a base station ID having a priority higher than the base station IDs stored in the storage, and whose acquisition number is larger than a predetermined number of times. The manager is configured to delete, from the storage, a base station information including a base station ID having a priority lower than the base station ID judged to have a higher priority, and to store, in the storage, a base station information including the base station ID judged to have the higher priority, in a case where the judging unit judges there is the base station ID having a the higher priority and whose acquisition number is larger.

In the base station according to the first aspect, the acquisition unit acquires base station IDs of cell to and from which the mobile station moves. In addition, the determination unit determines a priority of each of the base station IDs on the basis of the acquisition numbers. Moreover, the judging unit judges whether or not there is a base station ID to be stored in the storage on the basis of the predetermined number of times and the priorities. Furthermore, the manager deletes a base station information from the storage, and then stores a base station information in the storage on the basis of the result of the judgment by the judging unit. For this reason, according to the invention, it is possible to determine the priority of a other base station located in the surrounding zone on the basis of how frequently the mobile station moves in the base station. Accordingly, the base station located in the surrounding zone can be more accurately identified than otherwise while base station information on a other base station located in the surrounding zone can be more accurately stored in the storage than otherwise. In addition, only base station information including a base station ID whose acquisition number is not less than a predetermined number of times is stored in the storage. Accordingly, only base station information of a other base station where the mobile station frequently moves, which is located in the surrounding zone, can be more accurately stored in the storage. Moreover, although an operation for storing information in the storage has been manually performed in a conventional system, the operation can be automatically performed according to the present invention. For this reason, it is possible to reduce workload, which involves a large numbers of operations for storing base station information in the storage, required when a new base station is established.

In the first aspect of the present invention, the acquisition unit may acquire a base station ID when the mobile station hands over or when the mobile station changes a current cell of the mobile station. According to the invention, on the basis of radio ranges of other base stations from which the mobile station receives radio signals, it is possible to accurately acquire the base station ID of a other base station located in the surrounding zone.

In addition, in the first aspect of the present invention, on the basis of location information of the mobile station measured by the mobile station, the acquisition unit may acquire the base station ID of one of the other base stations forming a cell corresponding to the measured location information. According to the invention, a base station ID of a other base station located in the surrounding zone can be also acquired from the location information measured by the mobile station.

Moreover, in the first aspect of the present invention, the acquisition unit may acquire condition information which indicates conditions in communications between the mobile station and one of the base stations corresponding to the base station ID. In addition, the aggregating unit may aggregates the condition information for each base station ID acquired in the first time period. Moreover, the determination unit may determine the priority of each of the base station IDs on the basis of the aggregated results of the condition information in addition to the acquisition numbers. According to the invention, by taking into consideration the condition information indicating conditions in communications between the mobile station and other base stations, the base station ID of a base station located in the surrounding zone can be more accurately acquired.

Furthermore, in the first aspect of the invention, the condition information may be any one of a reception level of a radio signal measured by the mobile station and a delay time for communications.

Still further, in the first aspect, the manager may delete the base station information stored for more than a second time period. According to the invention, base station information stored in the storage is not deleted for the second time period. For this reason, it is possible to reduce the occurrence of a case where the base station information is immediately deleted, even when the priority of the base station information becomes temporarily low.

A second aspect of the present invention is a communications method of a base station that communicates with a mobile station by using radio signals. The method is characterized by including the steps of storing a predetermined number of base station information, each including a base station ID for discriminating a specific base station and parameter information for radio communications set for the specific base station; acquiring a base station ID of other base station forming a destination cell of the mobile station, or a base station ID of other base station forming a source cell of the mobile station; aggregating the number of times that each of the base station IDs is acquired in a first time period; determining a priority of each of the base station IDs on the basis of the aggregated results of the acquisition numbers; judging among the base station IDs whose acquisition numbers are aggregated whether or not there is a base station ID having a priority higher than the base station IDs stored in the storage, and whose acquisition number is larger than a predetermined number of times; and deleting, from the storage, a base station information including a base station ID having a priority lower than the base station ID thus judged to have a higher priority, and storing, in the storage, a base station information including the base station ID judged to have the higher priority, in a case where the judging unit judges that there is the base station ID having a the higher priority and whose acquisition number is larger.

According to the present invention, in a base station, parameter information for radio communications that the

BRIEF DESCRIPTION OF THE DRAWINGS

FIG. 5 is a view showing a movement history table according to the embodiment of the present invention.

FIG. 6 is a view showing an aggregating table according to the embodiment of the present invention.

FIG. 7 is a view showing a base station identifying table according to the embodiment of the present invention.

FIGS. 9A and 9B are a view showing a surrounding zone table at the time when the surrounding zone table is updated in the mobile communications system according to the embodiment of the present invention.

DETAILED DESCRIPTION OF THE PREFERRED EMBODIMENTS

Figure 1:
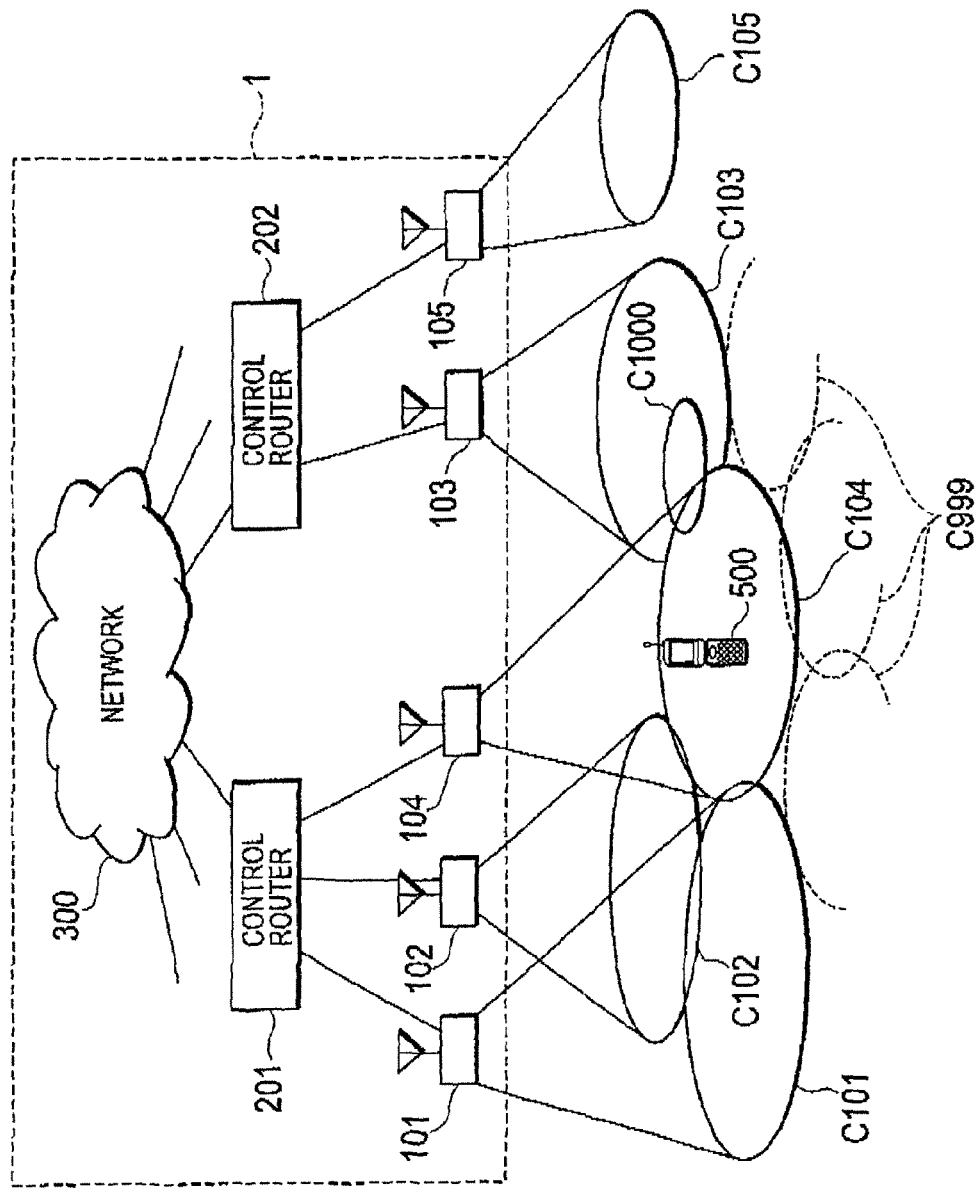
FIG. 1 is a schematic view showing a configuration of a mobile communications system according to an embodiment of the present invention.

An embodiment according to the present invention is described with reference to FIGS. 1 to 8. In the drawings referred to in the following description, the same reference numerals and symbols are given to parts having the same functions.

As shown in FIG. 1, a mobile communications system 1 according to the present embodiment includes a network 300, control routers 201 and 202, and base stations 101 to 105. The base stations 101 to 105 form cells C101 to C105 which are radio ranges, respectively. The mobile communications system 1 communicates with a mobile station 500 to exchange voice information and the like.

In the mobile communications system 1 according to the present embodiment, a CDMA scheme is adopted as a communications system for communicating with the mobile station 500. In the CDMA scheme, the same frequency band is shared for communications. In addition, in the case of the mobile communications system 1 according to the present embodiment, it is assumed that a frequency Division Duplex (hereinafter referred to as an FDD) or a Time Division Duplex (hereinafter referred to as a TDD) is adopted in the CDMA scheme. However, it may also be assumed that a Time Division Multiple Access (TDMA) scheme or a Frequency Division Multiple Access (FDMA) scheme be adopted instead of the CDMA scheme.

In addition, the mobile station 500 according to the present embodiment includes a function of detecting the coordinates of a position by using a Global Positioning System (GPS), a function of communicating not only with the mobile communications system 1 but also with other mobile communications systems including a radio LAN communications system, and also a function of measuring radio signals transmitted from the base stations 101 to 105. Moreover, in a case where the mobile station 500 hands over while communicating with one of the base stations 101 to 105, that is, in a case where the mobile station 500 moves to another cell while communicating with one of the base stations 101 to 105, or in a case where the mobile station 500 registers its position because a cell where the mobile station 500 is located is changed due to the movement, the mobile station 500 transmits information on the movement to one of the base stations 101 to 105 forming a cell, from which the mobile station 500 moves (hereinafter, sometimes referred to as a source cell), and to one of the base stations 101 to 105 forming a corresponding one of the cells C101 to C105, to which the mobile station 500 moves (hereinafter, sometimes referred to as a destination cell).

Here, the movement information is information which is transmitted by the mobile station 500 to one of the base stations 101 to 105 forming a source cell and to one of the base stations 101 to 105 forming a destination cell, when the mobile station 500 moves between cells. In addition, the movement information includes: a mobile station ID, which identifies the mobile station 500 that has transmitted the movement information; a base station ID and a scrambling code, which are transmitted from each of the base stations forming the source cell and the destination cell, respectively; and condition information measured by the mobile station 500. Moreover, the condition information is information that indicates communications conditions between a mobile station 500 and a base station corresponding to a base station ID, and includes a receiving level of a radio signal transmitted from one of the base stations 101 to 105 and a delay time of delay multiple wave in the radio signal.

In addition, suppose that the mobile station 500 is located in a cell C1000 shown as a radio range of a different mobile communications system (not illustrated) in FIG. 1, such as a wireless LAN communications system, and accordingly is in a state where the mobile station 500 is managed in the different mobile communications system. When the mobile station 500 moves from the different mobile communications system to one of the cells C101 to C105 formed by the base stations 101 to 105 of the mobile communications system 1, the mobile station 500 transmits location information including the coordinates of the position of the mobile station 500 detected in the source cell C1000 to one of the base stations 101 to 105 that forms a corresponding one of the cells C101 to C105 that is a destination cell. Here, location information is information that includes a mobile station ID for identifying the mobile station 500 having sent the location information and coordinates information including the latitude, the longitude and the altitude, which are measured by the mobile station 500.

Incidentally, in the present embodiment, it is assumed that the above-described mobile station 500 be a mobile device, such as a cellular telephone, a personal digital assistance (PDA) or a laptop computer.

The network 300 is connected to the control routers 201 and 202. In addition, the network 300 is provided with a control server (not illustrated), which manages a position of a cell where the mobile station 500 is located, and which also controls communications with the mobile station 500, and the like.

The control routers 201 and 202 are connected to the network 300, and also to the base stations 101 to 105. In addition, the control router 201 controls the base stations 101, 102 and 104, and the control router 202 controls the base stations the base stations 103 and 105. Moreover, the control routers 201 and 202 communicate with each other via the network 300.

The base stations 101 to 105 are connected to the control routers 201 and 202. In addition, the base stations 101 to 105 communicate with one another via the control routers 201 and 202 and the network 300. Moreover, the base stations 101 to 105 form the cells C101 to C105, respectively, and each of the base stations 101 to 105 communicates with a mobile station located in a corresponding one of the cells C101 to C105 with a radio signal. Furthermore, the present embodiment is described by taking as an example a case where the cells 101 to 102 and cells C999 are formed in a zone surrounding the cell C104 formed by the base station 104, in a manner that the cells C101 to C103, and C999 are contiguous to the cell C104, as shown in FIG. 1.

In addition, a downlink scrambling code different from base station to base station, that is, a spreading code used for a downlink, is set for each of the base stations 101 to 105, as parameter information for radio communications. Here, the present embodiment is described by taking as an example a case where the parameter information for radio communications serves as a scrambling code. It should be noted that, the parameter for radio communications may be a downlink timeslot in a mobile communications system of the TDMA scheme, or may be a downlink frequency band in a mobile communications system of the FDMA scheme.

In addition, the mobile communications system 1 according to the present embodiment is described with an assumption that a base station ID set for the base station 101 is denoted by "B101," that a base station ID set for the base station 102 is denoted by "B102," that a base station ID set for the base station 103 is denoted by "B103," that a base station ID set for the base station 104 is denoted by "B104," and that a base station ID set for the base station 105 is denoted by "B105." Moreover, the mobile communications system 1 according to the present embodiment is described with an assumption that a scrambling code set for the base station 101 is denoted by "11," that a scrambling code set for the base station 102 is denoted by "12," that a scrambling code set for the base station 103 is denoted by "13," that a scrambling code set for the base station 104 is denoted by "14," and that a scrambling code set for the base station 105 is denoted by "15." Furthermore, the present embodiment is described with an assumption that a pair of a base station ID and a scrambling code is used as base station information.

The mobile communications system 1 according to the present embodiment is described with taking the following case as an example. Specifically, in the mobile communications system 1 according to the present embodiment, a plurality of control routers (not illustrated) are connected to the network 300 besides the control routers 201 and 202. In addition, each of the plurality of unillustrated control routers controls a plurality of base stations (not illustrated). Moreover, each of the plurality of unillustrated base stations forms a corresponding one of the plurality of cells C999 shown in FIG. 1, and there are 32 cells or more exist in the zone surrounding the cell C104.

Figure 2:
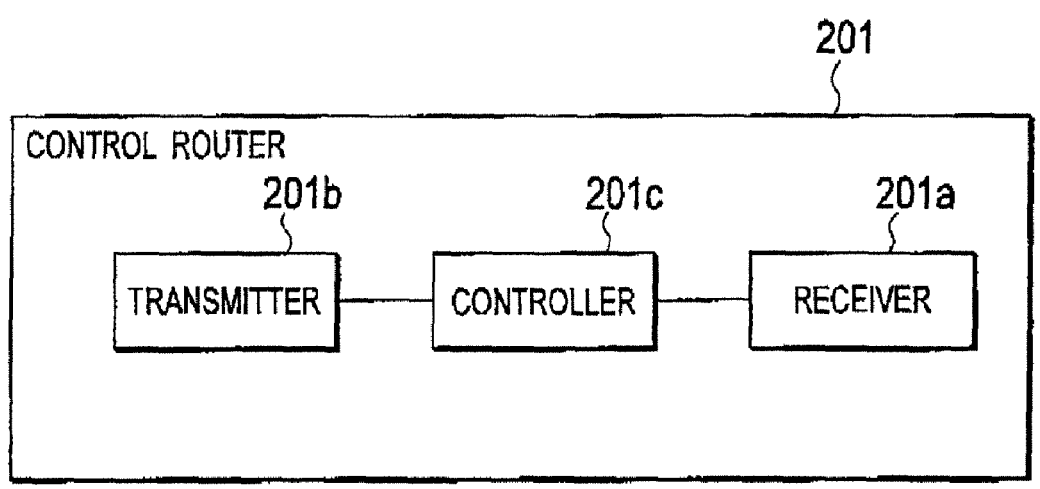
FIG. 2 is a block diagram showing a configuration of control routers according to the embodiment of the present invention.

Next, configurations of the control routers 201 and 202 according to the present embodiment are described in detail with reference to FIG. 2. Since the configurations of the control routers 201 and 202 are the same as each other, only the configuration of the control router 201 is described. As shown in FIG. 2, the control router 201 is provided with a receiver 201a, a transmitter 201b, and a controller 201c.

The receiver 201a receives various kinds of information transmitted from the base stations 101 to 105, and the network 300. The transmitter 201b transmits various kinds of information to the base stations 101 to 105, and the network 300. The controller 201c controls various kinds of functions provided to the control router 201.

Next, configurations of the base stations 101 to 105 according to the present embodiment are described in detail with reference to FIGS. 3 to 7. Since the configurations of the base stations 101 to 105 are the same as one another, only the configuration of the base station 104 is described.

Figures 3, 4:
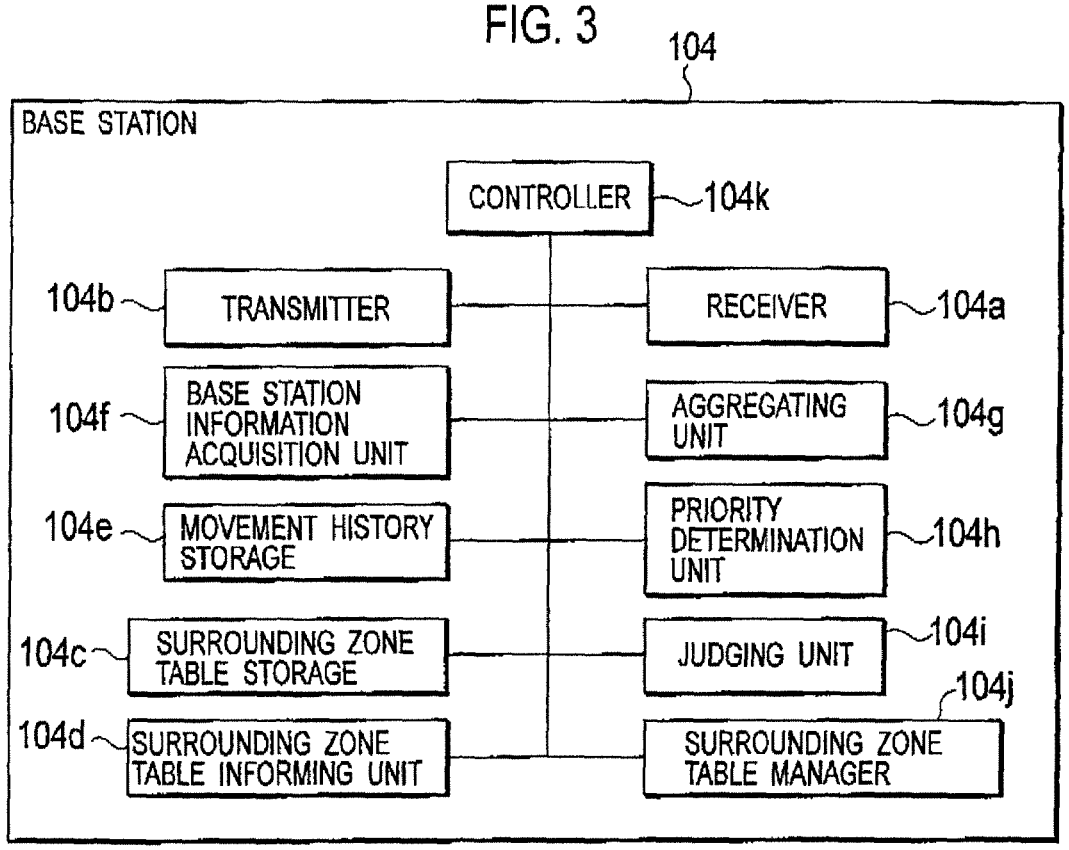
FIG. 3 is a block diagram showing a configuration of a base station according to the embodiment of the present invention.
FIG. 4 is a view showing a surrounding zone table according to the embodiment of the present invention.

As shown in FIG. 3, the base station 104 includes a receiver 104a, a transmitter 104b, a surrounding zone table storage 104c, a surrounding zone table informing unit 104d, a movement history storage 104e, a base station information, acquisition unit 104f, a aggregating unit 104g, a priority determination unit 104h, a judging unit 104i, a surrounding zone table manager 104j, and a controller 104k.

The receiver 104a receives movement information and location information, both of which are transmitted from the mobile station 500. The transmitter 104b transmits storing request information and deleting request information to another base station via the control routers 201 and 202, and the network 300.

Here, the storing request information is information for requesting a base station on the receiving side to store base station information of the base station on the transmitting side in a surrounding zone table which will be described later. The storing request information includes the base station information of the base station on the transmitting side. Specifically, the storing request information includes a base station ID of the base station on the transmitting side and a scrambling code set for the base station on the transmitting side. On the other hand, the deleting request information is information for requesting a base station on the receiving side to delete base station information of the base station on the receiving side stored in the surrounding zone table which will be described later. The deleting request information includes a base station ID of the base station on the transmitting side.

In addition, by control of the surrounding zone table informing unit 104d which will be described later, the transmitter 104b informs the mobile station 500 that is located in the cell C104 formed by the own base station (the base station 104) of all the base station IDs and the scrambling codes stored in the surrounding zone table.

The surrounding zone table storage 104c is provided with the surrounding zone table TA1 shown in FIG. 4. In the surrounding zone table TA1, a predetermined number of sets of base station information are stored. Each set of base station information includes a base station ID for identifying a base station and parameter information for radio communications set for the base station.

Specifically, in the surrounding zone table TA1, a set of base station information including a base station ID "B104" of the own base station 104 that is of the surrounding zone table storage 104c and a scrambling code "14" set for the own base station, as well as sets of base station information regarding other base stations, for example, a set of base station information including a base station ID "B101" of the base station 101 and a scrambling code "11" set for the base station 101.

In addition, the predetermined number described above is the number of sets of base stations information, which can be stored in the surrounding zone table TA1. The present embodiment is described by taking as an example a case where the number of sets of base stations information that can be stored in the above-described surrounding zone table TA1 is assumed to be 32.

The surrounding zone table informing unit 104d inform to the mobile station 500 of all of the sets of base station information (each set including a base station ID and a scrambling code) stored in the surrounding zone table TA1 by a control channel via the transmitter 104b.

The movement history storage 104e is provided with a movement history table TA2 and an aggregating table TA3.

As shown in FIG. 5, in the movement history table TA2, sets of information each including a "year/month/day/hour/minute/second," a "mobile station ID," a "base station ID at source/destination," a "scrambling code," a "receiving level" and a "delay time" are stored in a manner that these pieces of information in each set are associated with one another. These pieces of information stored in the movement history table TA2 are described in detail later.

As shown in FIG. 6, in the aggregating table TA3, pieces of information such as a "priority," a "base station at source/destination," a "scrambling code," the "acquisition number," an "average of receiving level," and an "average of delay time." These pieces of information stored in the aggregating table TA3 are described in detail later.

When the mobile station 500 hands over, or when the mobile station 500 changes the current cell, the base station information acquisition unit (acquisition unit) 104f acquires a base station ID of another base station forming a cell to or from which the mobile station 500 moves. In addition, the base station information acquisition unit 104f configured to acquire a base station ID of other base station forming a destination cell of the mobile station 500, or a base station ID of other base station forming a source cell of the mobile station 500. Specifically, when the receiver 104a receives movement information which the mobile station 500 transmits when moving between cells, the base station information acquisition unit 104f acquires a "mobile station ID," a "base station ID" of the source/destination, a "scrambling code," a "receiving level" and a "delay time" all included in the movement information. In addition, the base station information acquisition unit 104f is provided with a calendar function and a clock function, and acquires the "year/month/day/hour/minute/second" corresponding to the date and time at which the receiver 104a receives the movement information. The base station information acquisition unit 104f stores, in the movement history table TA2, the "year/month/day/hour/minute/second" thus acquired, the "mobile station ID," the "base station ID," the "scrambling code," the "receiving levels" and the "delay time" in a manner that these pieces of information are associated with one another.

In addition, on the basis of location information measured by the mobile station 500, the base station information acquisition unit 104f acquires a base station ID of another base station that forms a cell corresponding to the location information. Specifically, the base station information acquisition unit 104f is provided with a base station identifying table TA4 shown in FIG. 7. In the base station identifying table TA4, stored in advance are: all of the "base station IDs," which are provided to the mobile communications system 1; "scrambling codes," which are set respectively for the base stations that can be discriminated from one another by the "base station IDs;" and "base station cell range coordinates," each of which indicates coordinates within the range of a corresponding one of the cells formed by the base stations. All of these pieces of information are stored in a manner that they are associated with each other. Moreover, when the receiver 104a receives location information measured by the mobile station 500, the base station information acquisition unit 104f acquires "latitude/longitude/altitude" included in the location information and "year/month/day/hour/minute/second" corresponding to date and time at which the receiver 104a receives the location information. Then, by referring to the base station identifying table TA4, the base station information acquisition unit 104f specifies "base station cell range coordinates," within the range of which the "latitude/longitude/altitude" included in the location information falls. Moreover, the base station information acquisition unit 104f acquires the "base station ID" and the "scrambling code" both of which have been stored in association with the "base station cell range coordinates." Furthermore, the base station information acquisition unit 104f stores, in the movement history table TA2, the "year/month/day/hour/minute/second," the "base station ID," and the "scrambling code", which are thus acquired, in a manner that they are associated with each other.

The aggregating unit 104g aggregates, for each base station ID, the number of times that the base station ID is acquired in a first time period, and condition information. Specifically, by referring to the movement history table TA2, the aggregating unit 104g counts the number of times that the "base station ID" is stored in the first time period, for example, in one hour, and thereby aggregates the number as the "acquisition number" for each base station ID. In addition, the aggregating unit 104g calculates the arithmetic averages of "receiving lever" stored in association with the "base station ID," and thereby aggregates the arithmetic averages respectively as an "average of receiving level". In addition, the aggregating unit 104g calculates the arithmetic averages of "delay time" stored in association with the "base station ID," and thereby aggregates the arithmetic averages respectively as an "average of delay time". Then, the aggregating unit 104g stores, in the aggregating table TA3: the "base station ID;" the "scrambling code" having been stored in association with the "base station ID;" the "acquisition number," the "average of receiving lever" and the "average of delay time," which are results of the aggregation, in such a way that the "base station ID" and the "scrambling code" are associated with the "acquisition number," the "average of receiving level" and the "average of delay time." In addition, at this time, by referring to the surrounding zone table TA1, the aggregating unit 104g determines whether or not there is a "base station ID" other than those stored in the aggregating table TA3, in the surrounding zone table TA1. In a case where there is such a "base station ID" in the surrounding zone table TA1, the aggregating unit 104g further stores, in the aggregating table TA3, the "base station ID" and a "scrambling code," which has stored in association with the "base station," along with the "acquisition number" having set at "0", in a manner that these are associated with one another. When the above-described processes are completed, the aggregating unit 104g informs the priority determination unit 104h, which is described later, of the completion of the processes. In addition, the aggregating unit 104g performs the above-described processes in a cycle for each first time period. Moreover, the aggregating unit 104g deletes all the information having stored in the aggregating table TA3 before starting the processes. The first time period may be 10 minutes, one day, one week, one month or the like. Alternatively, the first time period may be, for example, a period for which the base station information acquisition unit 104f stores 1000 pieces of information in the movement history table TA2.

The priority determination unit (determination unit) 104h determines the priority of each base station ID on the basis of the aggregated results of the acquisition number and the condition information by the aggregating unit 104g. Specifically, when the priority determination unit 104h is informed by the aggregating unit 104g that the aggregating processes have been completed, the priority determination unit 104h refers to the aggregating table TA3. Then, the priority determination unit 104h determines the "priority," and thereby gives numbers starting from "1" in descending order of the "numbers of times of acquisitions" having been stored in association with the respective "base station IDs." Here, the present embodiment is described with an assumption that the number "1"

indicates the highest priority, and that the higher the number is, the lower the priority is. The priority determination unit 104h stores the determined "priorities" in the aggregating table TA3 in association with the respective "base station IDs."

At this time, in a case where there are "base station IDs" which have the same "acquisition number," the priority determination unit 104h determines the "priority" on the basis of the "average of receiving level" and the "average of delay time," which are the aggregating results of condition information. Specifically, the priority determination unit 104h gives a higher priority to a base station ID having larger values of the "average of receiving level" and the "average of delay time." It should be noted that, the priority determination unit 104h may determine the priority by adding weight to the aggregating results of the condition information, in such a way that a higher "priority" is given to a "base station ID" having the "average of delay time" larger than the "average of receiving level," or that a higher "priority" is given to a "base station ID" having the "average of receiving level" larger than the "average of delay time," or in another way. Moreover, once the priority determination unit 104h completes the above-described processes, the priority determination unit 104h informs the judging unit 104i, which is described later, of the completion.

The judging unit 104i a judging unit configured to judge among the base station IDs whose acquisition numbers are aggregated whether or not there is a base station ID having a priority higher than the base station ID stored in the surrounding zone table (storage) TA1, and whose acquisition number is larger than a predetermined number of times. The judging unit 104i refers to the surrounding zone table TA1 and the aggregating table TA3. The judging unit 104i thereby judges whether or not there is, among base station IDs listed in the aggregating table TA3, a base station ID which is higher in "priority" than those stored in the surrounding zone table TA1 and for which the "acquisition number" is a predetermined number or more. Specifically, when the judging unit 104i is informed by the priority determination unit 104h of the completion of the processes, the judging unit 104i refers to the aggregating table TA3. The judging unit 104i thereby judges whether or not there is a base station ID that is not stored in the surrounding zone table TA1, among base station IDs having the priorities ranging from 1 to 32 (within the number of base station information which can be stored in the surrounding zone table TA1) in the aggregating table TA3. Thereafter, when the judging unit 104i judges that there is such a "base station ID," the judging unit 104i judges whether or not the "acquisition number" having been stored in association with the "base station ID" is not less than a predetermine number that is set in advance, for example, 150. It should be noted that the above-described predetermined number may be 100 or 500, or may be varied depending on the time of year. Then, when the judging unit 104i judges that the "acquisition number" for the base station ID is 150 or more, the judging unit 104i identifies the "base station ID" as a "storing base station ID".

Still further, after the judging unit 104i identifies the "storing base station ID", the judging unit 104i judges whether or not there is, in the aggregating table TA3, a "base station ID" having a "priority" lower than "32," i.e. the number is larger than "32," among "base station IDs" stored in the surrounding zone table TA1. When the judging unit 104i judges that there is such a "base station ID," the judging unit 104i judges the "base station ID" as a "deletion base station ID". It should be noted that, at this time, when there is a "base station ID" being "B104" of the own base station (base station 104) among "base station IDs" stored in the surrounding zone table TA1, the judging unit 104i does not select the "base station ID" being "B104" of the own base station as the "deletion base station ID". After the judging unit 104i completes the above-described processes, the judging unit 104i informs the surrounding zone table manager 104j of the identified "storing base station ID" and "deletion base station ID". Through the above-described processes, the judging unit 104i identifies a base station ID to be stored in the surrounding zone table TA1 and a base station ID to be deleted.

When the judging unit 104i judges that there is a "storing base station ID", the surrounding zone table manager 104j deletes base station information including a base station ID having a priority lower than the "storing base station ID", from the surrounding zone table TA1 in the surrounding zone table storage 104c. Then, the surrounding zone table manager (manager) 104j stores base station information which includes the "storing base station ID" having a higher priority, in the surrounding zone table TA1. Specifically, when the surrounding zone table manager 104j is informed by the judging unit 104i of the "storing base station ID" and the "deletion base station ID", the surrounding zone table manager 104j refers to the surrounding zone table TA1, and then deletes base station information including the "deletion base station ID". Then, the surrounding zone table manager 104j refers to the aggregating table TA3, and then stores, in the surrounding zone table TA1, the "storing base station ID" and base station information including a scrambling code stored in association with the "storing base station ID". In addition, the surrounding zone table manager 104j transmit deleting request information to a other base station, which is identified with the "deletion base station ID", via the transmitter 104b. With the deleting request information, the surrounding zone table manager 104j requests the other base station to delete base station information including the base station ID, "B104," of the own base station (base station 104) stored in a surrounding zone table of the other base station. Moreover, the surrounding zone table manager 104j transmits storing request information to a other base station, which is identified with the "storing base station ID", via the transmitter 104b. With the storing request information, the surrounding zone table manager 104j requests the other base station to store the base station information of the own base station (base station 104) in a surrounding zone table of the base station. By the above-described processes, from the surrounding zone table TA1, deleted are base station information of those among the base stations 101 to 105 forming contiguous cells, where the mobile station 500 less frequently moves, and in the surrounding zone table TA1, stored are of base station information of those among the base stations 101 to 105 forming contiguous cells, where the mobile station 500 frequently moves.

The controller 104k controls various kinds of functions provided to the base station 104. In addition, for example, in a case where the own base station (base station 104) is a newly established one, at the time of starting operations, the controller 104k acquires base station information respectively of other base stations, and then stores those in the surrounding zone table TA1. At this time, the base station information may be acquired on the basis of movement information transmitted from the mobile station 500, or may be acquired from the control routers 201 and 202, or may be acquired from a control server (not illustrated) of the network 300.

(Operations of Mobile Communications System)

Operations of the mobile communications system 1 according to the present embodiment are described with reference to FIGS. 4 to 9. Operations of various kinds of functions provided to the base station 104 are described in particular. Here, the present embodiment is described with an assumption that the base station 104 is a newly established one which has started operations, and that base stations 101 to 103 and 105 are those which have been already established.

In addition, as shown in FIG. 4, in the surrounding zone table TA1 of the base station 104 before starting operations to be described later, stored in advance are sets of base station information including base station IDs (B101 and B102) respectively of the base stations 101 and 102 located in the surrounding zone, and scrambling codes (11 and 12) corresponding to the base station IDs. However, a set of base station information including a base station ID (B103) of the base station 103 located in the surrounding zone and a scrambling code (13) corresponding to the base station ID is not stored in the surrounding zone table TA1. That means that a set of base station information which should be stored is not stored in the surrounding zone table TA1. Moreover, in the surrounding zone table TA1, a set of base station information including a base station ID (B105) of the base station 105 which is not located in the surrounding zone, and a scrambling code (15) corresponding to the base station ID is stored. That means that a set of base station information (the set of base station information of the base station 105) that should not be stored is stored in the surrounding zone table TA1.

Operations are described below taking as an example a case in which the base station 104 provided with the above-described surrounding zone table TA1 performs aggregating processes, priority determining processes, judging processes, and surrounding zone table updating processes.

First, in the base station 104, a receiver 104a receives movement information transmitted from the mobile station 500. In addition, the base station information acquisition unit 104f stores, in a movement history table TA2, acquired "year/month/day/hour/minute/second," "mobile station IDs," a "base station IDs," "scrambling codes," "receiving levels," and "delay time" in such a manner that those pieces of information are associated with one another.

In addition, in the base station 104, when the receiver 104a receives location information measured by the mobile station 500, the base station information acquisition unit 104f refers to a base station identifying table TA4, and thereby acquires "base station IDs" and "scrambling codes." At the same time, the base station information acquisition unit 104f stores the "base station IDs," "scrambling codes," and "year/month/day/hour/minute/second" in the movement history table TA2 in a manner that those pieces of information are associated with each other.

Figure 8:
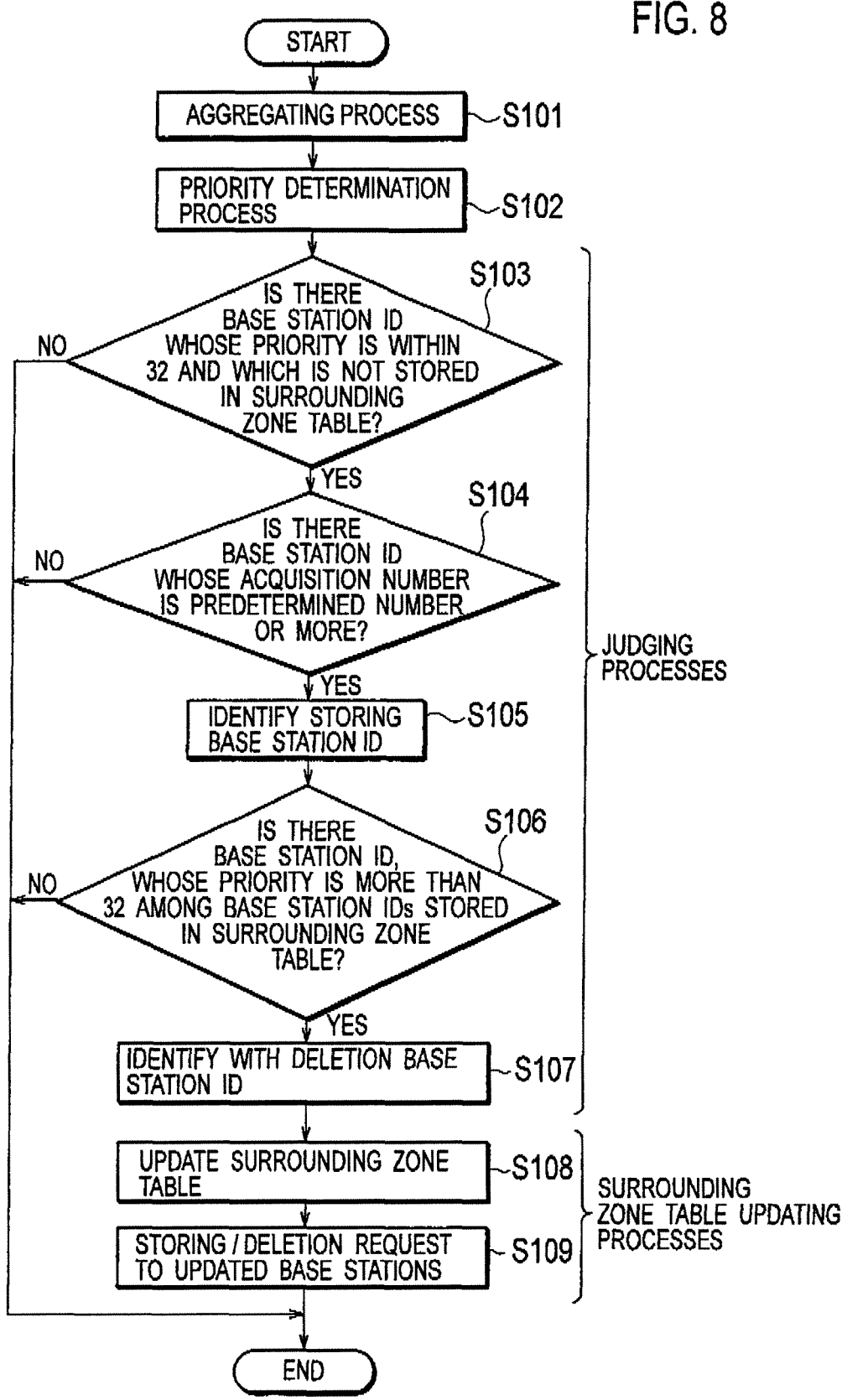
FIG. 8 is a flowchart sowing operations of the base station according to the embodiment of the present invention.

In Step S101 in FIG. 8, after a first time period elapses, the aggregating unit 104g performs aggregating processes. Specifically, by referring to the movement history table TA2, the aggregating unit 104g counts the number of times that each "base station ID" is stored in the first time period, e.g. in one hour, and then aggregates the counted number as the "acquisition number" for each base station ID. In addition, the aggregating unit 104g calculates arithmetic averages respectively of the "receiving level" and the "delay time" stored in association with each "base station ID." The aggregating unit 104g aggregates the calculated arithmetic averages as "average of receiving level," AvQ1 to AvQz, and "averages of delay time," AvT1 to AvTz. Then, as shown in FIG. 6, the aggregating unit 104g stores, in the aggregating table TA3, each "base station ID," the "scrambling code" having been stored in association with the "base station ID," and the "acquisition number," the "average of receiving level," the "average of delay time".

Moreover, at this time, by referring to the surrounding zone table TA1 shown in FIG. 4, the aggregating unit 104g judges whether or not there is a "base station" other than those stored in the aggregating table TA3, in the surrounding zone table TA1. When the aggregating unit 104g judges that there is "B105" as the above "base station ID," the aggregating unit 104g stores the "B105" and a "scrambling code" of "15" stored in association with the "B105," and the "acquisition number" of "0" in the aggregating table TA3 in a manner that those pieces of information are associated with each other. When the above-described aggregating processes are completed, the aggregating unit 104g informs the priority determination unit 104h of the completion of the processes.

In Step S102, the priority determination unit 104h performs the priority determining process. The priority determination unit 104h determines the priority of each base station ID on the basis of the results of the aggregation of the acquisition number and the condition information, which aggregation has been performed by the aggregating unit 104g. Specifically, when the priority determination unit 104h is informed by the aggregating unit 104g of the completion of the aggregating processes, the priority determination unit 104h determines, by referring to the aggregating table TA3, "priorities" in descending order of the "numbers of times of acquisitions" starting from "1." In addition, the priority determination unit 104h stores, in the aggregating table TA3, the "priorities" in association respectively with the "base station IDs." Moreover, the priority determination unit 104h informs the judging unit 104i of the completion of the above-described priority determining processes.

In Step S103, when the judging unit 104i is informed by the priority determination unit 104h of the completion of the priority determining processes, the judging unit 104i judges, by referring to the aggregating table TA3, whether or not there is a base station ID that is not stored in the surrounding zone table TA1, among base station IDs having the priorities ranging from 1 to 32. When the judging unit 104i judges that there is such a "base station ID," the judging unit 104i performs a process in Step S104. When the judging unit 104i judges that there is not such a "base station," the judging unit 104i terminates the operations.

In Step S104, the judging unit 104i judges that there is a "base station ID," for example, "B103," that is not stored in the surrounding zone table TA1, among base station IDs having descending numbers from 1 to 32. Thereafter, the judging unit 104i judges whether the "acquisition number," which is stored in association with the "base station ID" of "B103," is "150" or more. As shown in the aggregating table TA3 in FIG. 6, since the "acquisition number," which is stored in association with the "base station ID" being "B103," is "180," the judging unit 104i judges that the "acquisition number" is "150" or more, and thus performs a process in Step S105 When the judging unit 104i judges that the "acquisition number" is less than "150," the judging unit 104i terminates the operation.

In Step S105, the judging unit 104i identifies, as a "storing base station ID", the "base station ID" being "B103" for which the "acquisition number" is determined to be "150" or more in Step S104.

In Step S106, the judging unit 104i judges whether or not there is, in the aggregating table TA3, a "base station ID" for which the "priority" is lower than "32" among "base station IDs" stored in the surrounding zone table TA1. Here, the judging unit 104i judges that, among "base station IDs" stored in the surrounding zone table TA1 shown in FIG. 4, there is "B105" as the "base station ID" being lower in priority than "32" in the aggregating table TA3. Thus the judging unit 104*i* performs an operation in Step S107. It should be noted that, when the judging unit 104*i* determines that there is no such a "base station ID," the judging unit 104*i* terminates the operation.

In Step S107, the judging unit 104*i* identifies the "base station ID" being "B105" judged in Step S106, as a "deletion base station ID". Then, the judging unit 104*i* informs the surrounding zone table manager 104*j* of the "storing base station ID" "B103" and the "deletion base station ID" "B105" identified respectively in Steps S105 and S107. Incidentally, in a case where there is a space enough for base station information including the "storing base station ID" identified in Step S105 to be stored in the surrounding zone table TA1, the judging unit 104*i* may inform the surrounding zone table manager 104*j* of only the "storing base station ID" without performing operations in Steps S106 and S107.

In Step S108, when the surrounding zone table manager 104*j* is informed by the judging unit 104*i* of the "storing base station ID" and the "deletion base station ID", the surrounding zone table manager 104*j* performs surrounding zone table updating processes. Specifically, when the surrounding zone table manager 104*j* is informed by the judging unit 104*i* of the "storing base station ID" "B103" and the "deletion base station ID" "B105," the surrounding zone table manager 104*j* refers to the surrounding zone table TA1, as shown in FIGS. 9A and 9B, and deletes base station information "A1", which includes the "deletion base station ID" "B105," and a scrambling code "15" stored in association with the "deletion base station ID" "B105." Subsequently, the surrounding zone table manager 104*j* stores, in the surrounding zone table TA1, the "storing base station ID" "B103," and a scrambling code "13" stored in association with the "storing base station ID" "B103" in the aggregating table TA3. Here, as shown in FIG. 9B, the surrounding zone table manager 104*j* stores base station information "A2" including the "storing base station ID" "B103" and a scrambling code "13", in the surrounding zone table TA1.

Incidentally, in a case where there is a enough space to store the base station information including the "storing base station ID", in the surrounding zone table TA1, and concurrently where the "deletion base station ID" is not informed but only the "storing base station ID" is informed, the surrounding zone table manager 104*j* may store base station information including the "storing base station ID" "B103" and the scrambling code "13" in the surrounding zone table TA1.

In Step S109, the surrounding zone table manager 104*j* transmits deleting request information, which request to delete the base station information including the base station ID "B104" (own base station 104), to the base station 105 which is identified with the "deletion base station ID" "B105", via the transmitter 104*b*. The base station 105 having received the deleting request information deletes the base station information including the base station ID "B104" of the base station 104, which is included in the deleting request information, from the surrounding zone table.

In addition, the surrounding zone table manager 104*j* transmit storing request information to the base station 103 which is identified with the "storing base station ID" "B103." With the storing request information, the surrounding zone table manager 104*j* requests the base station 103 to store the base station information including the base station ID "B104" of the own base station (base station 104) and the scrambling code "14" in a surrounding zone table of the base station 103. Then, the base station 103 having received the storing request information stores, in the surrounding zone table, the base station information including the base station ID "B104" of the base station 104 and the scrambling code "14," which is included in the storing request information. At this time, the base station 103 deletes base station information including a base station ID for which the "priority" is the lowest (the largest number) among base station IDs stored in the surrounding zone table TA1.

The present embodiment has been described by taking as the example the case where the aggregating processes, the priority determining processes, the determining processes and the surrounding zone updating processes are performed in the newly established base station 104. However, these various processes described above are also performed in the base stations 101 to 103, and the base station 105. In addition, the present embodiment has been described by taking as the example the case where there are a single "storing base station ID" and a single "deletion base station ID". However, there may be a plurality of "storing base station IDs" and a plurality of deletion base station IDs. Incidentally, in the case where there are a plurality of "storing base station IDs" and a plurality of "deletion base station IDs", the base station deletes 104 base station information from the surrounding zone table TA1 in ascending order of priority in the aggregating table TA3; and the base station 104 deletes base station information is stored in the surrounding zone table TA1 in descending order of priority in the aggregating table TA3.

(Operation and Effect of Mobile Communications System)

According to the mobile communications system 1 according to the present embodiment, for example, in the base station 104, the priority determination unit 104*h* determines priorities of base station IDs, so that a high priority is given to a base station ID of a base station forming a cell where the mobile station 500 frequently moves. In addition, in the base station 104, the judging unit 104*i* identifies the "deletion base station ID" and the "storing base station ID" of the surrounding zone table TA1 based on the determined priority and the predetermined number of times. Moreover, on the basis of the identified "deletion base station ID" and "storing base station ID", the surrounding zone table manager 104*j* deletes base station information from the surrounding zone table TA1, and stores base station information corresponding to the "storing base station ID" in the surrounding zone table TA1. Accordingly, sets of base station information of base stations forming cells, where the mobile station 500 frequently moves, are stored in the surrounding zone table TA1, and sets of base station information of base stations forming cells C101 to C105, where the mobile station 500 moves less frequently, are deleted from the surrounding zone table TA1.

According to the mobile communications system 1, at a base station, parameter information (scrambling codes and the like) for radio communications which are informed from the own base station is set with high accuracy, and surrounding zone updating processes are automatically performed. As a result, workload in storing base station information in the surrounding zone table TA1 can be reduced.

Moreover, according to the mobile communications system 1, in a case where the number of the base stations 101 to 105 located in the surrounding zone is larger than the number of base station information that can be stored in the surrounding zone table TA1, a base station information of base station forming a cell where the mobile station 500 frequently moves is given a priority, and thereby the base station information can be stored in the surrounding zone table TA1 in preference to other base station information. As a result, the number of mobile stations 500, which leads to problems, such as an interruption of radio communications, can be reduced.

In addition, according to the mobile communications system 1, a base station ID is acquired when the mobile station 500 hands over or when the mobile station 500 changes the current cell. Accordingly, a base station ID of another base station located in the surrounding zone can be more accurately acquired than otherwise, on the basis of the radio range of another base station where the mobile station 500 actually receives. Moreover, according to the mobile communications system 1, a base station ID of another base station located in the surrounding zone can be also acquired from location information measured by the mobile station. Accordingly, the priorities can be determined by acquiring a larger number of base station IDs than otherwise. Furthermore, according to the mobile communications system 1, by taking into consideration condition information indicating a communicating condition between the mobile station 500 and a base station, the priority of another base station is determined. As a result, base station information of a base station located in the surrounding zone can be acquired with high accuracy.

Modified Embodiment

A configuration of a mobile communications system 1 according to a modified embodiment is described focusing on differences from the above-described embodiment. The mobile communications system 1 according to the present modified embodiment is the same as that of the above-described embodiment, except the configuration of a surrounding zone table manager 104j in each base station 101 to 105. For this reason, the configuration of the surrounding zone table manager 104j is described.

The surrounding zone table manager 104j according to this modified embodiment has the following characteristic. Specifically, the surrounding zone table manager 104j firstly stores base station information in the surrounding zone table TA1 of the surrounding zone table storage 104c, and then deletes the base station information after a second time period elapses. Here, the second time period is longer than the above-described first time period. Specifically, after the priority determination unit 104h stores base station information in the surrounding zone table TA1 by surrounding zone table updating processes, the priority determination unit 104h does not delete the stored base station information from the surrounding zone table TA1 in the second time period, e.g. in 12 hours when performing the subsequent surrounding zone table updating processes.

In the mobile communications system 1 according to this modified embodiment, base station information stored in the surrounding zone table updating processes is not deleted for the second time period. As a result, it is possible to reduce the occurrence of a case where base station information is immediately deleted, even when the priority of the base station information becomes temporarily lower.

Other Embodiment

Although one embodiment of the present invention has been described just for illustrative purpose, the present invention is not intended to be limited to the embodiment. Accordingly, various modifications may be made on the specific configurations or the like of the components without departing from the spirit of the present invention. In addition, it is also possible to combine configurations of the embodiment and configurations of the modified embodiments. Moreover, on the operations and effects of the embodiment and the modified embodiment, only preferable ones which are produced from the present invention are enumerated. For this reason, the operations and effects are not limited to those described in the embodiment and the modified embodiment.

What is claimed is:

1. A base station that communicates with a mobile station by using radio signals, comprising:
    a storage unit for storing a predetermined number of base station information, each including a base station ID for discriminating a specific base station and parameter information for radio communications set for the specific base station;
    an acquisition unit for acquiring base station IDs of base stations forming destination cells of the mobile station, or base station IDs of base stations forming source cells of the mobile station during a first time period;
    an aggregating unit for aggregating a number of times that each of the base station IDs is acquired by the acquisition unit;
    a determination unit for determining a priority of each of the base station IDs on a basis of the aggregated results obtained by the acquisition unit;
    a judging unit for judging among the base station IDs whose acquisition numbers are aggregated whether or not there is a base station ID having a priority higher than the base station ID stored in the storage, and whose acquisition number is larger than a predetermined number of times; and
    a manager for deleting, from the storage, a base station information including a base station ID having a priority lower than a base station ID judged to have a higher priority, and to store, in the storage, a base station information including the base station ID judged to have a higher priority, in a case where the judging unit judges there is a base station ID having a higher priority than the base station ID stored in the storage and whose acquisition number is larger.

2. The base station according to claim 1, wherein the acquisition unit acquires a base station ID when the mobile station hands over or when the mobile station changes a current cell of the mobile station.

3. The base station according to claim 1, wherein, on the basis of location information of the mobile station measured by the mobile station, the acquisition unit acquires a base station ID of another base station forming a cell corresponding to the measured location information.

4. The base station according to claim 1, wherein
    the acquisition unit acquires condition information which indicates conditions in communications between the mobile station and one of the base stations corresponding to a base station ID;
    the aggregating unit aggregates the condition information for each base station ID acquired in the first time period; and
    the determination unit determines the priority of each of the base station IDs on a basis of the aggregated results of the condition information.

5. The base station according to claim 4, wherein the condition information is any one of a reception level of a radio signal measured by the mobile station and a delay time for communications.

6. The base station according to claim 1, wherein the manager deletes the base station information stored for more than a second time period.

7. A communications method of a base station that communicates with a mobile station by using radio signals, comprising the steps of:
    storing a predetermined number of base station information, each including a base station ID for discriminating a specific base station and parameter information for radio communications set for the specific base station;

acquiring a base station ID of a base station forming a destination cell of the mobile station, or a base station ID of a base station forming a source cell of the mobile station during a first time period;

aggregating a number of times that each of the base station IDs is acquired in the step of acquiring;

determining a priority of each of the base station IDs on a basis of the results of the step of aggregating;

judging among the base station IDs whose acquisition numbers are aggregated whether or not there is a base station ID whose priority is higher than the base station IDs stored in the storage, and whose acquisition number is larger than a predetermined number of times; and deleting, from the storage, a base station information including a base station ID having a priority lower than a base station ID determined by the step of judging to have a higher priority, and storing, in the storage, a base station information including the base station ID judged to have a higher priority, in a case where the judging step judges that there is a base station ID having a higher priority than the base station IDs stored in the storage and whose acquisition number is larger.

* * * * *